United States Patent
Yoshida et al.

[11] Patent Number: 6,167,021
[45] Date of Patent: Dec. 26, 2000

[54] OPTICAL RECORDING MEDIUM

[75] Inventors: Nobuhisa Yoshida, Zushi; Katsumi Suzuki, Chofu, both of Japan

[73] Assignee: Kabushiki Kaisha Toshiba, Kawasaki, Japan

[21] Appl. No.: 09/383,390

[22] Filed: Aug. 26, 1999

[30] Foreign Application Priority Data

Aug. 26, 1998 [JP] Japan .................................. 10-240498

[51] Int. Cl.[7] ....................................................... G11B 7/24
[52] U.S. Cl. ................................ 369/275.2; 430/270.13; 428/64.4
[58] Field of Search .............................. 369/275.4, 275.2, 369/275.3, 282, 280, 292, 272; 430/270.13; 428/64.4, 64.1

[56] References Cited

U.S. PATENT DOCUMENTS

| | | | |
|---|---|---|---|
| 5,241,531 | 8/1993 | Ohno et al. ............................ | 369/275.2 |
| 5,657,303 | 8/1997 | Namoto et al. ........................ | 369/44.32 |
| 5,812,519 | 9/1998 | Kawamura et al. ................... | 369/275.1 |
| 6,031,808 | 2/2000 | Ueno ...................................... | 369/111 |

*Primary Examiner*—Tan Dinh
*Attorney, Agent, or Firm*—Pillsbury Madison & Sutro LLP

[57] ABSTRACT

An optical recording medium of the present invention includes a light-transmitting substrate having spiral or concentric grooves formed in at least one major surface, a phase change recording film which is formed on the grooved surface of the substrate and reversibly changes phase upon irradiation of a light beam and thereby changes optical characteristics, and a reflecting layer formed on the phase change recording film, characterized in that the spiral or concentric grooves form, on at least one major surface of the substrate, lands and grooves as a rewrite region in which data is rewritten, the distance between the outer perimeter of the rewrite region and the center of the spiral or circle of the grooves is 58.5 mm or less, and the distance between the centers of a land and a groove adjacent to each other is 0.61 μm to 0.62 μm.

20 Claims, 3 Drawing Sheets

OPTICAL RECORDING MEDIUM

BACKGROUND OF THE INVENTION

The present invention relates to an optical recording medium and, more particularly, to an optical recording medium having a phase change recording film which reversibly changes its phase upon irradiation of light and thereby changes its optical characteristics.

The entire surface of a recording film of a phase change type optical disk is in amorphous state, i.e., in recorded state immediately after the manufacture. Ideally, in this phase change type optical disk, a recording mark as an amorphous state and a background as a crystalline state are formable by overwrite recording immediately after the manufacture.

When a recording film is formed by the conventional method, however, the amorphous state of the recording film immediately after the formation is excessively stable. Therefore, first overwrite recording using an optical disk drive cannot turn the recording film crystalline immediately after the formation. For this reason, the general approach is to crystallize the entire surface of the recording film by using an initial crystallizing apparatus having a high-output laser, before data is recorded in a phase change type optical disk by using an optical disk drive.

Phase change type optical disks as described above are roughly classified into two types: High to Low (to be referred to as HtoL hereinafter) media whose reflectance in amorphous state (recorded state) is lower than in crystalline state (erased state), and Low to High (to be referred to as LtoH hereinafter) media whose reflectance in amorphous state (recorded state) is higher than in crystalline state (erased state).

Since higher reflectance can be obtained in crystalline state rather than in amorphous state in the HtoL media, the reflected light amount cannot be insufficient immediately after the initial crystallization. Accordingly, the HtoL media do not make servo control unstable when overwrite recording is performed by using an optical disk drive immediately after the initial crystallization.

When data is overwritten in the HtoL media immediately after the initial crystallization, the average reflectance lowers because the recording mark formed is amorphous. In this case, however, servo control cannot be unstable. This is because the area of a recorded portion and the area of an unrecorded portion in an overwrite-recorded optical disk are substantially equal, so the average reflectance is about intermediate between the reflectance in crystalline state and the reflectance in amorphous state. That is, in an overwrite-recorded optical disk, a reflected light amount enough for stable servo control is obtained.

In the HtoL media as described above, sufficiently high reflectance is obtained both immediately after the initial crystallization and after the overwrite recording. Hence, servo control cannot be unstable in the HtoL media.

In contrast, in the LtoH media, the reflectance in crystalline state is lower than that in amorphous state. Therefore, a sufficient reflected light amount cannot always be obtained immediately after the initial crystallization. Accordingly, the LtoH media may interfere with servo control for the reason which will be described in detail below.

Recently, recording marks are becoming increasingly finer as the recording density of optical disks increases. Therefore, to obtain a large signal (reflectance change rate) from a fine recording mark, the reflectance in crystalline state is often decreased in the LtoH media.

This will be described below by using a modulation factor. Letting $R_a$ be the reflectance in amorphous state and $R_c$ be the reflectance in crystalline state, the modulation factor is defined as $(R_a-R_c)/R_a$. This modulation factor is an index of the magnitude of a signal. More specifically, it is possible by decreasing $R_c$ to increase the modulation factor, i.e., obtain a larger signal.

Presently, to realize a recording capacity of 4.7 GB per side of a disk to meet an increasing recording density of, e.g., a DVD-RAM, a track pitch of about 0.59 µm and a bit pitch of about 0.28 µm are under examination (the track pitch of a DVD-ROM is made narrower than that of a DVD-RAM because the former is a read only memory). Under these conditions, when a mark edge recording method is adopted, the C/N ratio (Carrier to Noise Ratio) must be 53 dB or more in order for a reproduction jitter amount to be 8% or less. According to calculations, this means that when $R_a$ is 20% and $R_c$ is 4%, the modulation factor is 80% or more.

Unfortunately, if the reflectance of the recording film immediately after the initial crystallization is set to 4% or less in the LtoH media, no sufficient reflected light amount is obtained when overwrite recording is performed by using an optical disk drive, so servo control becomes unstable. If information is recorded in this state, such inconvenience as the inability to reproduce recorded information takes place.

To eliminate the above inconvenience of the LtoH media, the use of a non-initialization type optical disk is pursued. This "non-initialization type optical disk" means an optical disk capable of overwrite recording using an optical disk driver immediately after the manufacture without requiring any recording film initial crystallization.

In this LtoH non-initialization type optical disk, first overwrite recording is performed for an amorphous recording film immediately after the manufacture, i.e., for a recording film whose entire surface is in recorded state in which the reflectance is high. Therefore, the LtoH non-initialization type optical disk does not presumably interfere with servo control when first overwrite recording is performed.

Although the non-initialization type optical disk has the aforementioned superior characteristic, this disk also has the following problem: when information is recorded in a predetermined track by radiating a laser beam, information recorded in adjacent tracks may be erased, i.e., cross erase may occur. Accordingly, reproduction of recorded information is sometimes difficult in the non-initialization type optical disk.

BRIEF SUMMARY OF THE INVENTION

The present invention has been made in consideration of the above problem, and has as its object to provide an optical recording medium which does not cause any cross erase even when used as a non-initialization type optical recording medium.

It is another object of the present invention to provide a non-initialization type optical recording medium which does not cause any cross erase.

According to one aspect of the present invention, there is provided an optical recording medium comprising a light-transmitting substrate having spiral or concentric grooves formed in at least one major surface, a phase change recording film which is formed on the grooved surface of the substrate and reversibly changes phase upon irradiation of a light beam and thereby changes optical characteristics, and a reflecting layer formed on the phase change recording film, wherein the spiral or concentric grooves form, on at least one major surface of the substrate, lands and grooves as a rewrite region in which data is rewritten, a distance between an outer perimeter of the rewrite region and a center of the spiral or circle of the grooves is 58.5 mm or less, and a distance between centers of a land and a groove adjacent to each other is 0.61 µm to 0.62 µm.

According to another aspect of the present invention, there is provided an optical recording medium comprising a light-transmitting substrate having spiral or concentric grooves formed in at least one major surface, a phase change recording film which is formed on the grooved surface of the substrate and reversibly changes phase upon irradiation of a light beam and thereby changes optical characteristics, and a reflecting layer formed on the phase change recording film, wherein the phase change recording film has a thickness of 50 Å to 300 Å, the spiral or concentric grooves form, on at least one major surface of the substrate, lands and grooves as a rewrite region in which data is rewritten, a distance between an outer perimeter of the rewrite region and a center of the spiral or circle of the grooves is 58.5 mm or less, and a distance between centers of a land and a groove adjacent to each other is 0.61 µm to 0.62 µm.

According to still another aspect of the present invention, there is provided a non-initialization type optical recording medium capable of overwrite recording immediately after manufacture without requiring any phase change recording film initial crystallization, comprising a light-transmitting substrate having spiral or concentric grooves formed in at least one major surface, a phase change recording film which is formed on the grooved surface of the substrate and reversibly changes phase upon irradiation of a light beam and thereby changes optical characteristics, and a reflecting layer formed on the phase change recording film, the spiral or concentric grooves form, on at least one major surface of the substrate, lands and grooves as a rewrite region in which data is rewritten, a distance between an outer perimeter of the rewrite region and a center of the spiral or circle of the grooves is 58.5 mm or less, and a distance between centers of a land and a groove adjacent to each other is 0.61 µm to 0.62 µm.

One characteristic feature of the optical recording medium of the present invention is that the distance between the centers of a land and a groove adjacent to each other, i.e., the track pitch, is 0.61 µm or more. In a common non-initialization type optical recording medium, cross erase occurs and sometimes makes reproduction of recorded information difficult. However, in the optical recording medium of the present invention the track pitch is increased to 0.61 µm or more. Therefore, even when the optical recording medium of the present invention is used as a non-initialization type optical recording medium, information can be recorded in a predetermined track without erasing information recorded in adjacent tracks. That is, the optical recording medium of the present invention prevents cross erase.

When the track pitch is increased as described above, the storage capacity of the recording medium probably decreases. In the optical recording medium of the present invention, however, the track pitch is 0.62 µm or less, and the distance between the outer perimeter of the rewrite region and the center of the spiral or circle of the grooves can be set to a maximum of 58.5 mm. Therefore, the optical recording medium of the present invention can ensure a sufficient storage capacity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

One embodiment of the present invention will be described in detail below with reference to the accompanying drawings.

Figure 1:
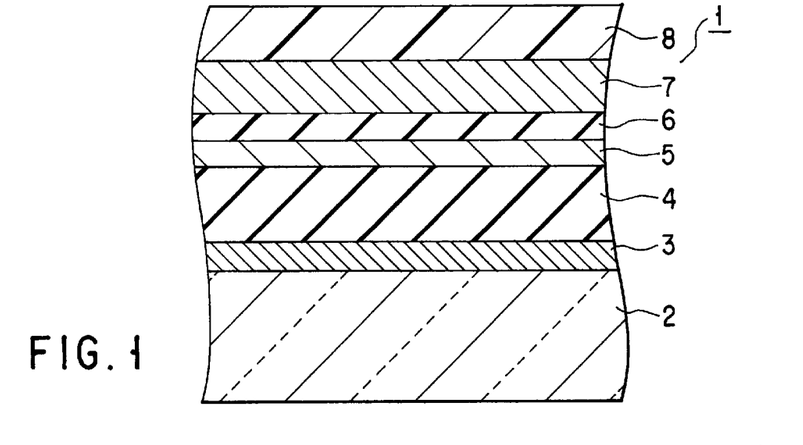
FIG. 1 is a sectional view showing an optical recording medium according to one embodiment of the present invention.

FIG. 1 is a sectional view schematically showing an optical recording medium according to one embodiment of the present invention. This optical recording medium shown in FIG. 1, i.e., an optical disk 1 has a structure in which a semitransparent interference layer 3, a dielectric film 4, a phase change recording film 5, a dielectric film 6, a metal reflecting layer 7, and a protective film 8 are stacked in this order on a substrate 2. Before a detailed explanation of the optical disk 1 according to the embodiment of the present invention, the reason why cross erase occurs in a common non-initialization type optical disk will be described below.

As described earlier, when the phase change recording film 5 is formed on the substrate 2 by sputtering or the like, this recording film 5 is in an excessively stable amorphous state immediately after the manufacture. Therefore, initial crystallization must be performed for an optical disk manufactured by the conventional method.

In contrast, the recording film 5 of a non-initialization type optical disk is in a more unstable amorphous state immediately after the manufacture. Accordingly, data can be recorded in a non-initialization type optical disk without any initial crystallization.

In a non-initialization type optical disk, however, the crystallization temperature of the recording film 5 lowers as the amorphous state of this recording film 5 is made more unstable. Consequently, information recorded in a non-initialization type optical disk is erased even when the recording film 5 is irradiated with a light beam which is relatively weak to the extent to which this light beam is of no problem for an optical disk requiring initial crystallization.

Figure 2:
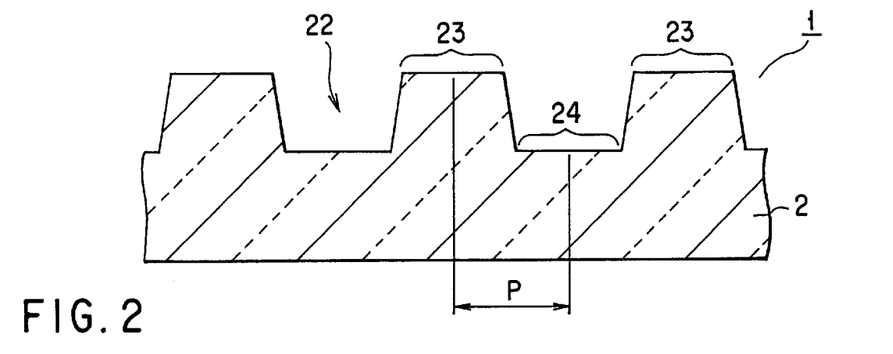
FIG. 2 is a sectional view schematically showing the optical recording medium according to the embodiment of the present invention.

FIG. 2 is a sectional view more macroscopically showing the optical disk 1 shown in FIG. 1. Referring to FIG. 2, the transparent interference layer 3, the dielectric film 4, the phase change recording layer 5, the dielectric film 6, the metal reflecting layer 7, and the protective film 8 are omitted.

As shown in FIG. 2, spiral or concentric grooves 22 are formed in one major surface of the substrate 2. These grooves 22 form lands 23 and grooves 24 on the surface of the substrate 2. Information is recorded in both the lands 23 and the grooves 24 of this optical disk 1.

Information is recorded in the lands 23 and the grooves 24 by radiating a light beam such as a laser beam onto the lands 23 and the grooves 24. The intensity of light beam used in an apparatus for, e.g., recording information in the optical disk 1 lowers from the spot center of the laser beam toward the outer perimeter. That is, this laser beam has an intensity distribution like a Gaussian distribution. Therefore, when a laser beam is radiated onto the groove 24, even the end portion of the land 23 is irradiated with a low-intensity laser beam.

As described above, information recorded in a non-initialization type optical disk is erased even when the recording film 5 is irradiated with a relatively weak light beam. Hence, if the end portion of the land 23 is irradiated with a low-intensity light beam while information is recorded in the groove 24, information recorded in this adjacent land 23 is easily erased. Consequently, cross erase readily occurs in a non-initialization type optical disk.

The present inventors have made extensive studies and found that this cross erase can be prevented by setting a track pitch P to 0.61 μm or more. That is, it is possible by setting the track pitch to 0.61 μm to reduce the intensity of a laser beam radiated onto the end portion of the groove 24 to the extent to which no information erasure takes place when the groove 24 is irradiated with this laser beam.

If a recording/reproducing apparatus has high accuracy, cross erase can sometimes be prevented even with a track pitch of 0.60 μm. However, to reliably prevent cross erase, it is desirable to set the track pitch P to 0.61 μm or more.

When the track pitch P is thus increased from a conventional track pitch of 0.59 μm to 0.61 μm or more, the storage capacity of the optical disk 1 decreases although cross erase can be prevented. Presently, a DVD-VIDEO must be capable of recording a 135-min movie per side of the disk in order to meet the demand on the market. That is, the optical disk 1 must have a storage capacity of 4.7 GB per side. To this end, a storage capacity of 4.7 GB per side must be achieved while the track pitch P is held at 0.61 μm or more.

Sufficient storage capacity can be obtained by increasing the area of a rewrite region in which information recording and erasure are performed.

Figure 3:
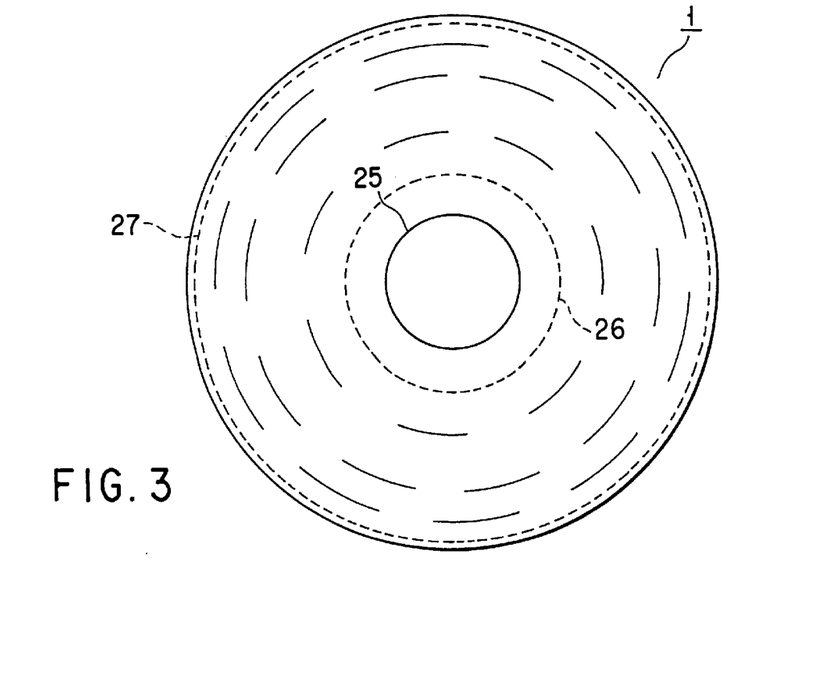
FIG. 3 is a plan view schematically showing the optical recording medium according to the embodiment of the present invention.

FIG. 3 is a plan view schematically showing the optical disk 1 shown in FIGS. 1 and 2. Referring to FIG. 3, this optical disk 1 is a DVD disk. The DVD disk 1 has a thickness of 0.6 mm and a radius of 60 mm. A circular hole 25 about 15 mm in diameter is formed in the center of this DVD disk 1. A region between broken lines 26 and 27 corresponds to the rewrite region in and from which information is recorded and erased. Note that the broken line 26 forms a circle having a radius of 24 mm.

As described above, the area of the rewrite region must be increased to obtain sufficient storage capacity. That is, the radius of the broken line 27 must be maximized. Hence, the radius of this broken line 27 is set to 58.5 mm in this embodiment.

Figure 4A:
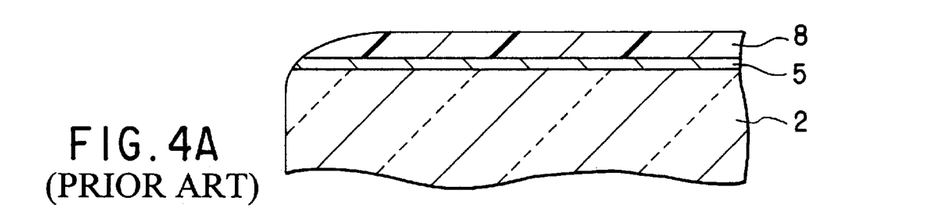
FIG. 4A is a sectional view schematically showing a conventional optical recording medium.

The upper-limit value of the radius of this broken line 27 is set to 58.5 mm for the reason explained below. As shown in FIG. 1, the major surface of the optical disk 1 according to the embodiment of the present invention is usually covered with the protective film 8. This protective film 8 is formed not only to prevent scratches on the recording film 5 and the like but also to prevent atmospheric moisture from entering the recording film 5 and the like. As shown in FIG. 4A, therefore, if the recording film 5 is formed to the edge of the substrate 2, atmospheric moisture enters the recording film 5 and the like. As a consequence, the recording film 5 may be oxidized, or each layer may be peeled.

Figure 4B:
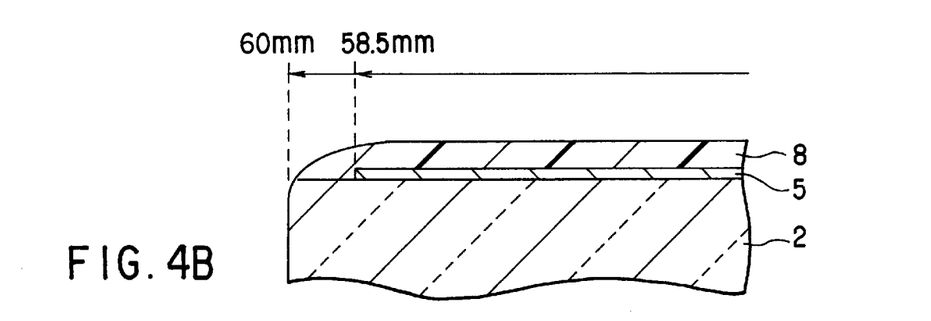
FIG. 4B is a sectional view schematically showing the optical recording medium according to the embodiment of the present invention.

To prevent a phenomenon like this, as shown in FIG. 4B, the recording film 5 and the like must be completely covered with the protective film 8. Since, however, the protective film 8 is formed by spin coating, the thickness of this protective film 8 decreases toward the outer perimeter of the substrate 2. Therefore, to reliably prevent the above-mentioned phenomenon, a region in which the recording film 5 and the like are formed is desirably separated by 1.5 mm or more and is more desirably separated by 2 mm or more from the outer perimeter of the substrate.

As described above, the radius of the substrate 2 is 60 mm. Accordingly, the formation region of the recording film 5 and the like is restricted to 58.5 mm from the center of the substrate. Consequently, the distance from the center of the substrate to the outer perimeter of the rewrite region is limited to 58.5 mm or less and preferably is 58 mm or less.

It is presumably possible to obtain sufficient storage capacity by increasing the area of the rewrite region. However, this is impossible if the track pitch P is excessively large. According to calculations, the maximum value of the track pitch P by which the aforementioned storage capacity is realizable is found to be 0.62 μm. Therefore, it is possible to prevent cross erase and obtain sufficient storage capacity by extending the rewrite region from the center of the disk to a distance of 58 mm and setting the track pitch P to 0.61 μm to 0.62 μm.

A method of forming the recording film 5 when the optical disk 1 is used as a non-initialization type optical disk will be described below.

The present inventors have considered that one reason why the stability of the amorphous state of the recording film 5 is excessively high immediately after the manufacture is that material atoms or material molecules of the recording film 5 collide at excessively high speed against the substrate surface. That is, on depositing the recording film material onto the substrate 2, since the material atoms or material molecules collide at very high speed against the substrate 2, the material is abruptly cooled from very high temperature at the instant when the material comes into contact with the substrate 2. This extremely high cooling rate excessively increases the stability of the amorphous state of the recording film 5 immediately after the film formation.

The speed of the material atoms or material molecules of the recording film 5 probably depends upon their mean free path. Therefore, by reducing the mean free path of the material atoms or material molecules, the incident energy of the material atoms or material molecules with respect to the substrate surface can be reduced.

When the recording film 5 is formed on the substrate 2 by vacuum sputtering, this mean free path can be presumably reduced by, e.g., increasing the sputtering gas pressure of Kr gas or the like and thereby increasing the number of collisions between the material atoms or material molecules and the sputtering gas. The recording film 5 of the optical disk 1 is generally formed by sputtering in a vacuum of about $5 \times 10^{-3}$ torr. The present inventors formed recording films 5 by using various materials and found that the stability of the amorphous state of every recording film immediately after the film formation can be reduced by raising the sputtering gas pressure regardless of the material used.

As this sputtering gas, the use of Kr gas or Xe gas is preferable. Ar, Kr, and Xe are homologous elements and chemically inert. In the periodic table, Kr is a one-period-higher element than Ar, and Xe is a two-period-higher element than Ar. That is, Kr and Xe have larger atomic weights than Ar. Therefore, when Kr gas or Xe gas is used, the kinetic energy of the above-mentioned material atoms or material molecules can be reduced more, i.e., the stability of the amorphous state immediately after the recording film formation can be reduced more, than when Ar gas is used.

The sputtering gas pressure is preferably $5 \times 10^{-2}$ torr or more. When the sputtering gas pressure is $5 \times 10^{-2}$ torr or more, the kinetic energy of the material atoms or material molecules can be further reduced. Also, the sputtering gas pressure is preferably $5 \times 10^{-1}$ torr or less. If the sputtering gas pressure is excessively raised, an excess amount of the sputtering gas may enter the recording film 5.

The materials and the like used in the optical disk 1 will be described below.

In this optical disk 1, a transparent substrate made of a synthetic resin such as polycarbonate or of glass is used as the substrate 2.

The phase change recording film 5 of this optical disk 1 must be made from a material which reversibly changes its phase between an amorphous state and a crystalline state upon irradiation of light. Examples of the material constructing this phase change recording film are a three-element alloy consisting of Ge, Sb, and Te, such as $Ge_2Sb_2Te_5$, and a three-element alloy consisting of In, Sb, and Te.

Information is recorded in the phase change recording film 5 by heating the recording film 5 to the melting point or higher and rapidly cooling the recording film 5 to amorphous state. Recorded information is erased by heating the recording film 5 in amorphous state to the crystallization temperature or more to less than the melting point to set the recording film 5 in crystalline state. Therefore, the phase change recording film 5 must be thin to the extent to which the recording film 5 is melted by irradiation of a laser beam or the like. Hence, the phase change recording film 5 is usually formed to have a thickness of about 50 Å to 300 Å.

Note that cross erase correlates not only with the track pitch but also with the heat capacity of the phase change recording film 5. That is, cross erase correlates with the film thickness and the like of the phase change recording film 5. When the track pitch is within the aforementioned range, cross erase can be prevented by setting the thickness of the phase change recording film 5 to about 50 Å to 300 Å, and can be prevented more effectively by setting the film thickness to about 50 Å to 150 Å.

The optical disk 1 usually has the dielectric films 4 and 6. These dielectric films 4 and 6 sandwich the recording film 5 to prevent evaporation of the recording film 5 when the recording film 5 is irradiated with a laser beam or the like. That is, the dielectric films 4 and 6 prevent the formation of pores in the recording film 5 and thereby protect the recording film 5 from heat.

Examples of the material of these dielectric films 4 and 6 are light-transmitting dielectric substances such as a ZnS—$SiO_2$ mixture, $SiO_2$, $TiO_2$, and $Al_2O_3$. In the optical disk 1, the dielectric film 4 is so designed as to optically enhance a reproduction signal by the combined effect with the semitransparent interference layer 3 and the metal reflecting layer 7. This dielectric film 4 is commonly formed to have a thickness of about 500 Å to 3,000 Å.

The dielectric film 6 is formed to be thin to accelerate the cooling of the recording film 5 melted by irradiation of a laser beam or the like. The thickness of this dielectric film 6 is controlled to about 50 Å to 300 Å. Recently, high recording rate is required with increasing data transfer rate. Since the sensitivity must be increased to meet this requirement, a slow cooling type (high heat holding type) optical disk is also being studied in addition to a rapid cooling type (low heat holding type) optical disk. When the optical disk 1 is to be used as this slow cooling type optical disk, therefore, the dielectric film 6 is usually formed to have a thickness of about 300 Å to 3,000 Å in order to increase the heat retaining properties.

For example, AlMo alloy and the like can be used as the material of the metal reflecting layer 7. This metal reflecting layer 7 is usually formed to have a thickness of about 500 Å to 3000 Å, in order to enhance a reproduction signal and to increase heat dissipation properties.

The optical disk 1 can have the semitransparent interference layer 3 between the substrate 2 and the recording film 5. Au is an example of the material of this semitransparent interference layer 3. This semitransparent interference layer 3 must be thin to the extent to which a laser beam or the like radiated from the substrate 2 side can reach the recording film 5. At the same time, the semitransparent interference layer 3 must have a certain thickness to enhance a reproduction signal by producing interference of light between this semitransparent interference layer 3 and the metal reflecting layer 7. To this end, the semitransparent interference film 3 is normally formed to have a thickness of about 20 Å to 200 Å.

The optical disk 1 generally has the protective film 8 on the metal reflecting layer 7. As described above, this protective film 8 is formed to prevent damages to the recording film 5 and the like and prevent atmospheric moisture from entering the recording film 5 and the like. The protective film 8 is formed by, e.g., spin-coating the metal reflecting layer 7 with a UV-curing resin by using a spin coater and radiating UV light.

An example of the present invention will be described below.

EXAMPLE

Figure 5:
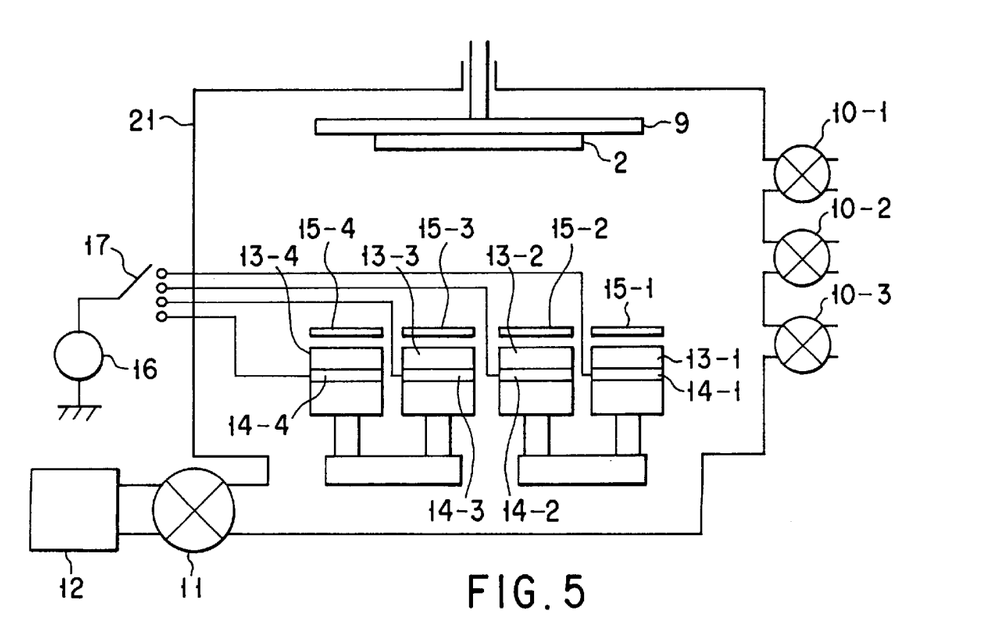
FIG. 5 is a view schematically showing a sputtering apparatus used in the manufacture of an optical recording medium according to an example of the present invention.

An optical disk 1 shown in FIGS. 1 to 3 was manufactured by using a sputtering apparatus shown in FIG. 5. FIG. 5 is a view schematically showing the sputtering apparatus used in the manufacture of the optical disk 1 according to this example of the present invention.

In the manufacture of the optical disk 1, a polycarbonate disk 2 120 mm in diameter and 0.6 mm in thickness, having one major surface in which 0.59-$\mu$m wide spiral grooves were formed, was held, with the grooved surface facing down, on a disk-like base 9 installed in a chamber 21. Note that this base 9 can rotate while holding the disk 2.

Next, a valve 11 was opened and a vacuum turbo pump 12 was driven to evacuate the chamber 21 to $10^{-6}$ torr. Additionally, while the base 9 was rotated at a velocity of 60 rpm, a valve 10-1 was opened to supply Ar gas into the chamber 21. The Ar gas pressure in the chamber 21 was adjusted to $5 \times 10^{-3}$ torr by controlling the Ar flow rate by using a mass flow controller (not shown) without changing the open state of the valve 11 and the exhaust ability of the vacuum turbo pump 12.

A switch 17 was used to electrically connect an RF power supply 16 to an electrode 14-1 and supply RF power of 13.56 MHz and 150 W to this electrode 14-1. Following the procedure as above, Ar gas sputtering of an Au target 13-1 placed on the electrode 14-1 was started. After pre-sputtering for about 1 min, a shutter 15-1 positioned above the Au target 13-1 was opened. After a predetermined time elapsed, the switch 17 was used to electrically insulate the RF power supply 16 from the electrode 14-1, and the shutter 15-1 was closed. In this manner, a 100-Å thick Au film was formed as a semitransparent interference layer 3 on the disk 2.

After the Au film 3 was formed, the valve 10-1 was closed, and the Ar gas and Au atoms remaining in the chamber 21 were exhausted by using the vacuum turbo pump 12. After the exhaustion, the valve 10-1 was again opened, and Ar gas was supplied into the chamber 21 while the flow rate was controlled by the mass flow controller, thereby adjusting the Ar gas pressure in the chamber to $5 \times 10^{-3}$ torr.

Next, the switch 17 was used to electrically connect the RF power supply 16 to an electrode 14-2 and supply RF power of 600 W to this electrode 14-2. Following the procedure as above, Ar gas sputtering of a ZnS/SiO$_2$ target 13-2 placed on the electrode 14-2 was started. After pre-sputtering for about 1 min, a shutter 15-2 positioned above the ZnS/SiO$_2$ target 13-2 was opened. After 4 min and 30 sec elapsed, the switch 17 was used to electrically insulate the RF power supply 16 from the electrode 14-2, and the shutter 15-2 was closed. In this manner, an 850-Å thick ZnS/SiO$_2$ film was formed as a dielectric film 4 on the Au film 3.

After the ZnS/SiO$_2$ film 4 was formed, the valve 10-1 was closed, and the Ar gas and ZnS/SiO$_2$ molecules remaining in the chamber 21 were exhausted by using the vacuum turbo pump 12. After the exhaustion, a valve 10-2 was opened, and Kr gas was supplied into the chamber 21 while the flow rate was controlled by the mass flow controller, thereby adjusting the Kr gas pressure in the chamber to $5 \times 10^{-2}$ torr.

Next, the switch 17 was used to electrically connect the RF power supply 16 to an electrode 14-3 and supply RF power of 200 W to this electrode 14-3. Following the procedure as above, Kr gas sputtering of a Ge$_2$Sb$_2$Te$_5$ target 13-3 placed on the electrode 14-3 was started. After pre-sputtering for about 1 min, a shutter 15-3 positioned above the Ge$_2$Sb$_2$Te$_5$ target 13-3 was opened. After 40 sec elapsed, the switch 17 was used to electrically insulate the RF power supply 16 from the electrode 14-3, and the shutter 15-3 was closed. In this manner, a 100-Å thick Ge$_2$Sb$_2$Te$_5$ film was formed as a phase change recording film 5 on the ZnS/SiO$_2$ film 4.

After the Ge$_2$Sb$_2$Te$_5$ film 5 was formed, the valve 10-2 was closed, and the Kr gas and Ge$_2$Sb$_2$Te$_5$ molecules remaining in the chamber 21 were exhausted by using the vacuum turbo pump 12. After the exhaustion, the valve 10-1 was opened, and Ar gas was supplied into the chamber 21 while the flow rate was controlled by the mass flow controller, thereby adjusting the Ar gas pressure in the chamber to $5 \times 10^{-3}$ torr.

Next, the switch 17 was used to electrically connect the RF power supply 16 to the electrode 14-2 and supply RF power of 600 W to this electrode 14-2. Following the procedure as above, Ar gas sputtering of the ZnS/SiO$_2$ target 13-2 placed on the electrode 14-2 was started. After pre-sputtering for about 1 min, the shutter 15-2 positioned above the ZnS/SiO$_2$ target 13-2 was opened. After 3 min elapsed, the switch 17 was used to electrically insulate the RF power supply 16 from the electrode 14-2, and the shutter 15-2 was closed. In this manner, a 300-Å thick ZnS/SiO$_2$ film was formed as a dielectric film 6 on the Ge$_2$Sb$_2$Te$_5$ film 5.

After the ZnS/SiO$_2$ film 6 was formed, the valve 10-1 was closed, and the Ar gas and ZnS/SiO$_2$ atoms remaining in the chamber 21 were exhausted by using the vacuum turbo pump 12. After the exhaustion, a valve 10-1 was again opened, and Ar gas was supplied into the chamber 21 while the flow rate was controlled by the mass flow controller, thereby adjusting the Ar gas pressure in the chamber to $5 \times 10^{-3}$ torr.

Next, the switch 17 was used to electrically connect the RF power supply 16 to an electrode 14-4 and Supply RF power of 200 W to this electrode 14-4. Following the procedure as above, Ar gas sputtering of an AlMo target 13-4 placed on the electrode 14-4 was started. After pre-sputtering for about 1 min, a shutter 15-4 positioned above the AlMo target 13-4 was opened. After 2 min and 30 sec elapsed, the switch 17 was used to electrically insulate the RF power supply 16 from the electrode 14-4, and the shutter 15-4 was closed. In this manner, a 1,000-Å thick AlMo film was formed as a metal reflecting layer 7 on the ZnS/SiO$_2$ film 6.

After these films were formed on the disk 2 by the method described above, the disk 2 was removed from the chamber 21. The AlMo film 7 of this disk 2 was spin-coated with a UV-curing resin by using a spin coater, and UV light was radiated to form a protective film 8 on this AlMo film 7.

As described above, the 100-Å thick Au film 3, the 850-Å thick ZnS/SiO$_2$ film 4, the 100-Å thick Ge$_2$Sb$_2$Te$_5$ film 5, the 300-Å thick ZnS/SiO$_2$ film 6, the 1,000-Å thick AlMo film 7, and the 8-μm thick protective film 8 were stacked in this order on the disk 2 to manufacture the optical disk 1 whose track pitch was 0.59 μm. This optical disk 1 is a sample A.

Additionally, optical disks 1 were manufactured following the same procedures as for the sample A except that the track pitch was changed to 0.60 μm, 0.61 μm, 0.62 μm, and 0.63 μm. These optical disks 1 are samples B, C, D, and E, respectively.

In these samples A to E, information could be recorded in both lands and grooves. Also, in these samples A to E, the rewrite region was extended to a position 58.5 mm from the center of the disk. As a consequence, the samples A to D could realize a storage capacity of 4.7 GB or more. However, the sample E could not achieve a storage capacity of 4.7 GB or more.

COMPARATIVE EXAMPLE

An optical disk 1 shown in FIG. 1 was manufactured following the same procedures as for the sample A except that a Ge$_2$Sb$_2$Te$_5$ film 5 was formed by the following method.

That is, an Au film 3 and a ZnS/SiO$_2$ film 4 were formed in this order on a disk 2 following the same procedures as for the sample A. After that, the valve 10-1 was closed, and the Ar gas and ZnS/SiO$_2$ molecules remaining in the chamber 21 were exhausted by the using the vacuum turbo pump 12. After the exhaustion, the valve 10-1 was again opened, and Ar gas was supplied into the chamber 21 while the flow rate was controlled by the mass flow controller, thereby adjusting the Ar gas pressure in the chamber to $5 \times 10^{-3}$ torr.

Next, the switch 17 was used to electrically connect the RF power supply to the electrode 14-3 and supply RF power of 200 W to this electrode 14-3. Following the procedure as above, Ar gas sputtering of the $Ge_2Sb_2Te_5$ target 13-3 placed on the electrode 14-3 was started. After pre-sputtering for about 1 min, the shutter 15-3 positioned above the $Ge_2Sb_2Te_5$ target 13-3 was opened. After 20 sec elapsed, the switch 17 was used to electrically insulate the RF power supply 16 from the electrode 14-3, and the shutter 15-3 was closed. In this manner, a 100-Å thick $Ge_2Sb_2Te_5$ film was formed as a phase change recording film 5 on the $ZnS/SiO_2$ film 4.

Following the same procedures as for the sample A, a $ZnS/SiO_2$ film 6, an AlMo film 7, and a protective film 8 were stacked in this order on the $Ge_2Sb_2Te_5$ film 5 to manufacture an optical disk 1. This optical disk 1 is a comparative sample.

Figure 6:
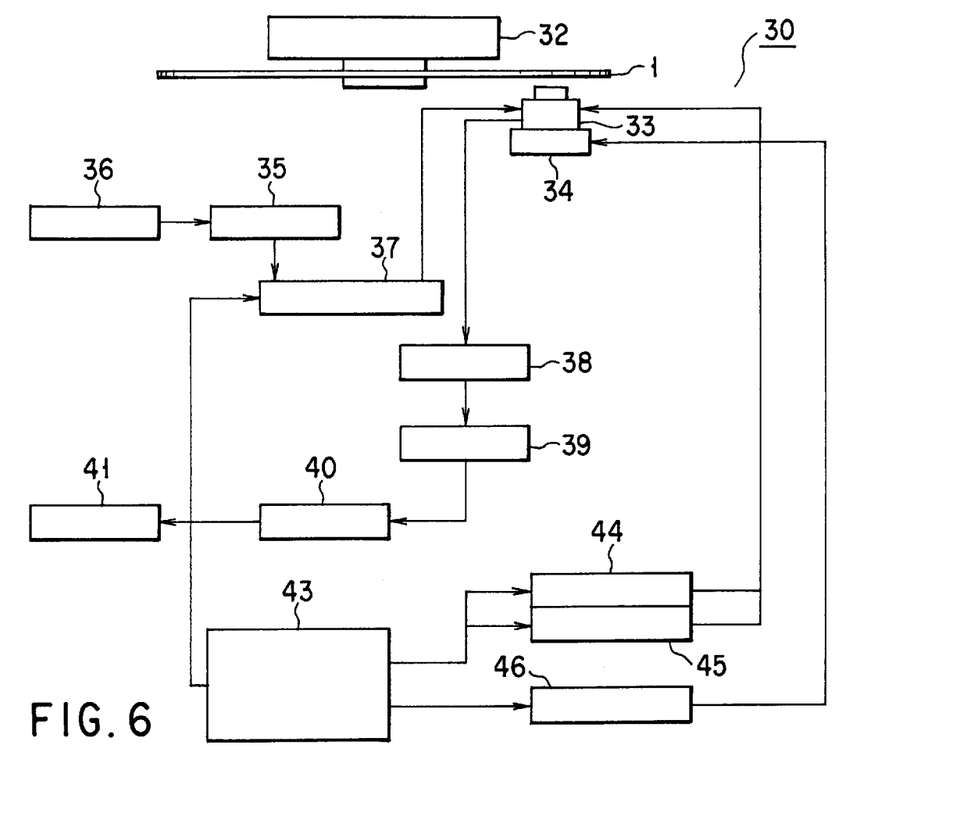
FIG. 6 is a view schematically showing an optical disk drive used in the example of the present invention.

An optical disk drive shown in FIG. 6 was used to evaluate the stability of the amorphous state of the phase change recording film 5 immediately after the manufacture of each of these samples A to E and comparative sample in accordance with the following method. FIG. 6 is a view schematically showing the optical disk drive used in the example of the present invention.

As shown in FIG. 6, the optical disk 1 is held by the spindle of a spindle motor 32. The disk 1 is rotated at a predetermined rotating velocity by controlling the rotating velocity of the spindle motor 32. In this example, assuming the optical disk 1 is a DVD-RAM, a so-called constant linear velocity method is employed. In this method, the rotating velocity of the disk 1 is changed in accordance with the distance between the rotating axis of the disk 1 and an optical head 33 such that the relative velocity between the disk 1 and the optical head 33 is fixed to 8.2 m/s.

When the optical disk 1 is a DVD-RAM, a modulation circuit 35 converts an input signal from an input device 36 into a digital signal of 1 or 0 by 8/16 modulation. This digital signal from the modulation circuit 35 is supplied to a laser driver 37 to control ON/OFF of an emitted laser beam from the optical head 33. In this manner, data is written in the optical disk 1.

Since the disk 1 of this example is a phase change type optical disk, all of recording of information to the disk 1 and erasure and reproduction of information recorded in the disk 1 are performed by irradiation of a laser beam or the like.

Figure 7:
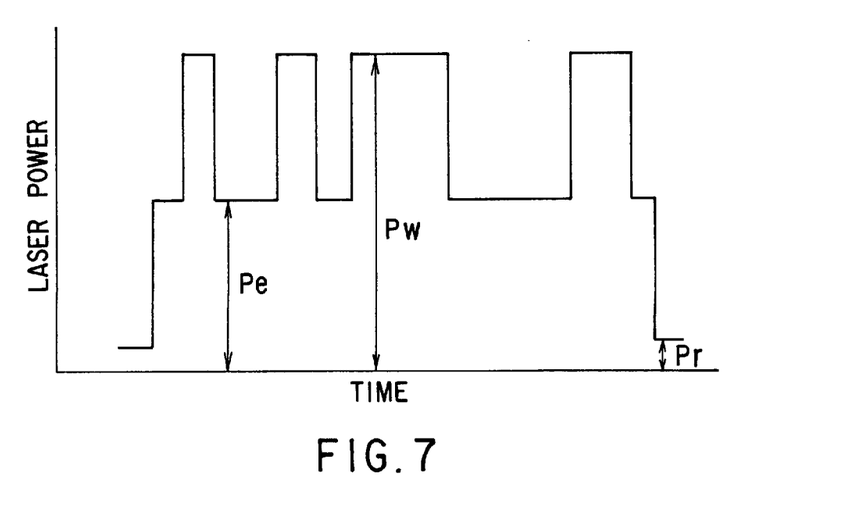
FIG. 7 is a graph showing the power of a laser beam necessary to record, erase, and reproduce information with respect to the optical recording medium according to the example of the present invention.

FIG. 7 is a graph showing the power of a laser beam necessary to record, erase, and reproduce information with respect to the optical disk 1 according to the example of the present invention. Referring to FIG. 7, the abscissa indicates time, and the ordinate indicates the laser beam power.

As shown in FIG. 7, to record information, the laser beam power is raised to $P_w$ to melt the phase change recording film, and the film is rapidly cooled to amorphous state. To erase recorded information, the laser beam power is set to about $P_e$ to heat the phase change recording film to the crystallization temperature or more to less than the melting point, thereby crystallizing the film. Reference symbol $P_r$ in FIG. 7 indicates laser beam power necessary to reproduce recorded information. When information is written in the disk 1, the written portion turns amorphous. Since an amorphous portion and a crystalline portion have different reflectances, a recorded signal can be detected as a reflected light amount difference by scanning the disk 1 with a constant weak laser beam.

A preamplifier 38 connected to the optical head 33 amplifies a reproduction signal obtained by irradiating the disk 1 with a laser beam of the power $P_r$. A binarizing circuit 39 converts the amplified reproduction signal into a digital signal. A demodulation circuit 40 demodulates this digital reproduction signal on the basis of 8/16 modulation and outputs the demodulated signal as an analog signal to an output device 41.

Referring to FIG. 6, a control system 43 is used to control the intensity of laser beam emitted from the optical head 33 via the laser driver 37 or to move the optical head 33 to a desired position by driving a linear motor 34 via a linear motor driving control system 46. This control system 43 is also used to drive an objective lens actuator of the optical head 33 via a focus driving control system 44 and a track driving control system 45, thereby controlling the position of an objective lens so that the objective lens follows surface deflection of the disk 1 or eccentric tracks.

The optical disk drive constructed as above, generally denoted by reference numeral 30 in FIG. 6, was used to evaluate the stability of the amorphous state of the phase change recording film immediately after the manufacture of each of the samples A to E and comparative sample in accordance with the following method. That is, this optical disk drive 30 was used to irradiate the disk 1 (the samples A to E and comparative sample) with an erasing laser beam having the power $P_e$ and a recording laser beam having the power $P_w$ shown in FIG. 7 without initially crystallizing the disks 1, thereby overwriting data.

Assuming that each disk 1 was a DVD-RAM, the rotating velocity of the spindle motor 32 was so controlled as to fix the linear velocity to 8.2 m/s, and mark edge recording was performed by irradiating the disk with a laser beam with a frequency of 9.72 MHz by 8/16 modulation and duty 50%, thereby forming 3T as the shortest mark length on the phase change recording film. Note that the power $P_w$, the power $P_e$, and the power $P_r$ were 13 mW, 6 mW, and 1 mW, respectively.

The phase change recording film was amorphous immediately after the manufacture, and all of the samples A to E and comparative sample were LtoH media, so the reflectance of the phase change recording film immediately after the manufacture was about 18%, a sufficiently large value. Accordingly, the optical disk drive 30 could perform servo control, and this servo control was not disabled during the test.

Next, information recorded in each disk 1 was reproduced, and the C/N ratio was measured by using a spectrum analyzer. If the C/N ratio was too low, it was possible to determine that the phase change recording film was incompletely crystallized by irradiation of the erasing laser beam having the power $P_e$, In this case, therefore, data was again overwritten.

The overwrite recording and the C/N ratio measurement were repeated for the same region of the phase change recording film until a sufficiently high C/N ratio was obtained. The stability of the amorphous state of the phase change recording film immediately after the manufacture was evaluated in terms of the number of times of the repetition. The results will be described below.

First, the above measurement was performed for the comparative sample. Immediately after the first overwrite recording, almost no spectrum of 9.72 MHz was observed. So, the overwrite recording and the C/N ratio measurement were repeated. Consequently, it was necessary to repeat the overwrite recording six times before the C/N ratio reached 40 dB. Also, it was necessary to repeat the overwrite recording 15 times before the C/N ratio reached 52 dB. From the foregoing, it was found that the amorphous state of the phase change recording film of the comparative sample was excessively stable immediately after the manufacture.

The above measurement was then performed for the sample A. As a consequence, a C/N ratio exceeding 49 dB was obtained by the first overwrite recording. Also, the C/N ratio reached 52 dB when the overwrite recording was repeated twice. The above measurement was also performed for the samples B to E, and substantially the same results as obtained for the sample A were obtained. That is, a C/N ratio exceeding 52 dB was obtained by the first or second overwrite recording.

The above results indicate that, by increasing the sputtering gas pressure in the formation of the phase change recording film, it is possible to reduce the degree of rapid cooling of the recording film material and lower the excess stability of the amorphous state of the phase change recording film immediately after the manufacture.

Next, the above optical disk drive 30 was used to evaluate cross erase of the samples A to E and comparative sample in accordance with the following method.

First, a signal of 9.72 MHz equivalent to the 3T signal as the shortest mark length was recorded in a predetermined track, e.g., a predetermined groove. The recorded portion was irradiated with a laser beam whose power $P_r$ was 1 mW to reproduce the recorded information, and the C/N ratio was measured. Note that this reproduction was done after the second overwrite recording, i.e., after the C/N ratio reached saturation.

Subsequently, an 11T signal (frequency 2.66 MHz, duty 50%) as the longest mark length was overwritten 10 times in adjacent tracks of the recorded portion, i.e., adjacent lands on the two sides of the land in which the information was recorded. Additionally, the information was reproduced from the groove in which the 3T signal was recorded, and the C/N ratio was measured. The results are summarized in the following table.

|  | Track pitch ($\mu$m) | Reproduction C/N ratio (dB) before OW | Reproduction C/N ratio (dB) after OW |
| --- | --- | --- | --- |
| Sample A | 0.59 | 52 | 46 |
| Sample B | 0.60 | 53 | 50 |
| Sample C | 0.61 | 53 | 52 |
| Sample D | 0.62 | 53 | 53 |
| Sample E | 0.63 | 53 | 53 |
| Comparative sample | 0.64 | 53 | 52 |

Note that the comparative sample was not a non-initialization type optical disk, so the entire disk surface was previously initially crystallized by using an initializing apparatus. Also, since this initial crystallization reduces the reflectance of the disk, the test was conducted while the settings of the disk drive 30 were finely adjusted such that servo control was not disabled.

As shown in the above table, in the comparative sample as an optical disk requiring initialization, the reproduction C/N ratio before overwrite (OW) recording on a land was 53 dB, whereas the reproduction C/N ratio after the overwrite recording was 52 dB.

On the other hand, it is evident from the data concerning the samples A to E that the reproduction C/N ratio of 52 dB or more after the overwrite recording can be obtained when the track pitch is set to 0.61 $\mu$m or more. That is, cross erase could be well prevented.

Comparison of the data pertaining to the samples A to E shows that the cross erase characteristic significantly changes in accordance with whether the track pitch is larger than 0.6 $\mu$m. This boundary value is substantially consistent with a half width (0.59 $\mu$m to 0.60 $\mu$m) obtained on the basis of the assumption that a laser beam having a wavelength of 660 nm forms a Gaussian intensity distribution when passing through an objective lens of NA 0.6.

The above results imply that, as in the samples C and D, by extending the rewrite region to a position 58.5 mm from the center of a disk and setting the track pitch within the range of 0.61 $\mu$m to 0.62 $\mu$m, it is possible to prevent cross erase and obtain sufficient storage capacity even in a non-initialization type optical disk.

In the above example, non-initialization type optical disks were manufactured by forming recording films by using Kr gas as a sputtering gas and setting the sputtering gas pressure to $5 \times 10^{-2}$ torr. However, Xe gas can also be used. Also, non-initialization type optical disks can be manufactured by some other method. Effects similar to those described above can be obtained by any non-initialization type optical disks regardless of their manufacturing methods.

In the above example, non-initialization type optical disks are explained. However, it is similarly possible to prevent cross erase and obtain sufficient storage capacity by optical disks requiring initial crystallization.

Furthermore, although LtoH media are explained in the above example, similar effects can be obtained by HtoL media.

In the above example, a GeSbTe-based material is used as the material of the phase change recording film. However, analogous effects can be obtained even when various phase change recording film materials such as InSbTe-based, AgInSbTe-based, and InSe-based materials are used.

According to the phase change optical recording medium of the present invention as has been described above, the distance between the outer perimeter of the rewrite region to the center of the disk can be increased to a maximum of 58.5 mm, and the track pitch is controlled to the range of 0.61 $\mu$m to 0.62 $\mu$m. As a consequence, it is possible to prevent cross erase and obtain sufficient storage capacity. That is, the present invention provides a phase change optical recording medium which does not cause any cross erase even when the medium is used as a non-initialization type recording medium. The present invention also provides a non-initialization type phase change optical recording medium which does not cause any cross erase.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical recording medium comprising:
    a light-transmitting substrate having spiral or concentric grooves formed in at least one major surface;
    a phase change recording film which is formed on the grooved surface of said substrate and reversibly changes phase upon irradiation of a light beam and thereby changes optical characteristics; and a reflecting layer formed on said phase change recording film, wherein said spiral or concentric grooves form, on at least one major surface of said substrate, lands and grooves as a rewrite region in which data is rewritten, a distance between an outer perimeter of said rewrite region and a center of the spiral or circle of said grooves is not more than 58.5 mm, and a distance between centers of a land and a groove adjacent to each other is 0.61 µm to 0.62 µm.

2. A medium according to claim 1, wherein said substrate has a shape of a disk 60 mm in radius.

3. A medium according to claim 2, further comprising a protective film formed on said reflecting layer to isolate said phase change recording film from the outside air.

4. A medium according to claim 3, wherein said rewrite region has a storage capacity of not less than 4.7 GB when a bit pitch is 0.28 µm.

5. A medium according to claim 3, wherein a distance between the outer perimeter of said rewrite region and the center of the spiral or circle of said grooves is 58.5 mm.

6. A medium according to claim 1, further comprising dielectric films between said substrate and said phase change recording film and between said phase change recording film and said reflecting layer.

7. A medium according to claim 1, further comprising a semitransparent interference layer between said substrate and said phase change recording film.

8. A medium according to claim 1, wherein said phase change recording film reversibly changes phase between a crystalline state and an amorphous state upon irradiation of the light beam.

9. A medium according to claim 8, wherein reflectance in the crystalline state is higher than reflectance in the amorphous state.

10. An optical recording medium comprising:

a light-transmitting substrate having spiral or concentric grooves formed in at least one major surface;

a phase change recording film which is formed on the grooved surface of said substrate and reversibly changes phase upon irradiation of a light beam and thereby changes optical characteristics; and a reflecting layer formed on said phase change recording film, wherein said phase change recording film has a thickness of 50 Å to 300 Å, said spiral or concentric grooves form, on at least one major surface of said substrate, lands and grooves as a rewrite region in which data is rewritten, a distance between an outer perimeter of said rewrite region and a center of the spiral or circle of said grooves is not more than 58.5 mm, and a distance between centers of a land and a groove adjacent to each other is 0.61 µm to 0.62 µm.

11. A non-initialization type optical recording medium capable of overwrite recording immediately after manufacture without requiring any phase change recording film initial crystallization, comprising:

a light-transmitting substrate having spiral or concentric grooves formed in at least one major surface;

a phase change recording film which is formed on the grooved surface of said substrate and reversibly changes phase upon irradiation of a light beam and thereby changes optical characteristics; and a reflecting layer formed on said phase change recording film, said spiral or concentric grooves form, on at least one major surface of said substrate, lands and grooves as a rewrite region in which data is rewritten, a distance between an outer perimeter of said rewrite region and a center of the spiral or circle of said grooves is not more than 58.5 mm, and a distance between centers of a land and a groove adjacent to each other is 0.61 µm to 0.62 µm.

12. A medium according to claim 11, wherein said substrate has a shape of a disk 60 mm in radius.

13. A medium according to claim 12, further comprising a protective film formed on said reflecting layer to isolate said phase change recording film from the outside air.

14. A medium according to claim 13, wherein said rewrite region has a storage capacity of not less than 4.7 GB when a bit pitch is 0.28 µm.

15. A medium according to claim 13, wherein a distance between the outer perimeter of said rewrite region and the center of the spiral or circle of said grooves is 58.5 mm.

16. A medium according to claim 11, further comprising dielectric films between said substrate and said phase change recording film and between said phase change recording film and said reflecting layer.

17. A medium according to claim 11, further comprising a semitransparent interference layer between said substrate and said phase change recording film.

18. A medium according to claim 11, wherein said phase change recording film reversibly changes phase between a crystalline state and an amorphous state upon irradiation of the light beam.

19. A medium according to claim 18, wherein reflectance in the crystalline state is higher than reflectance in the amorphous state.

20. A medium according to claim 11, wherein said phase change recording film has a thickness of 50 Å to 300 Å.

* * * * *